Jan. 1, 1952          L. S. BLUTH          2,580,396
RETAINING RING
Filed Nov. 9, 1946
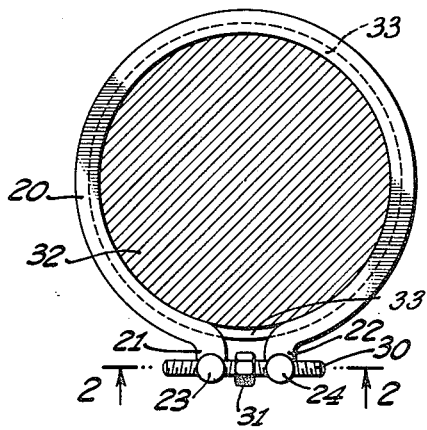
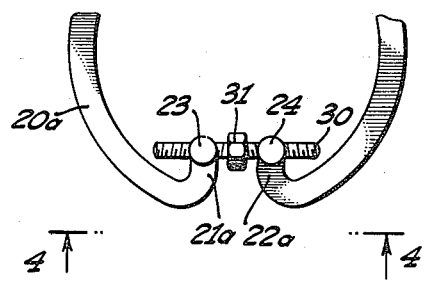
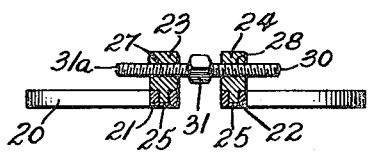
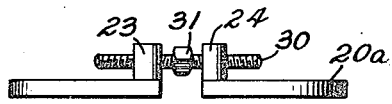
LUDWIG S. BLUTH,
INVENTOR.
BY
ATTORNEY.

Patented Jan. 1, 1952

2,580,396

UNITED STATES PATENT OFFICE 2,580,396

RETAINING RING

Ludwig S. Bluth, Los Angeles, Calif.

Application November 9, 1946, Serial No. 708,875

1 Claim. (Cl. 85—8.9)

This invention relates generally to retaining rings and more particularly to rings of this type which do not rely solely upon their natural resilience to hold them in an associated groove, but instead are positively yet controllably expanded or compressed to retain them in their proper positions.

Retaining rings of one form or another have long been used to hold gears, pulleys, and other items on a shaft, or to secure other elements, such as bearings, within a housing. These rings have generally been made of material having a rectangular or circular cross-section, though recently it has been proposed that such rings be made with a tapered or beveled edge which fits into the groove so that end play of the various elements, resulting from manufacturing tolerances, may be controlled. However, in each case, such rings have relied upon their own resilience to hold them in the groove with the result that a large load can only be safely applied when the bevel angle is very small.

In addition, to install these prior rings has generally required the use of special tools or some make-shift arrangement which has been clumsy. Where the retaining ring has been of a considerable size, the size of the tools used to install and remove the ring has become excessive. In certain applications, such as oil well equipment and machinery to give but one example, the need for those very large special tools has prevented the adoption of these rings in such fields.

It is therefore the major object of this invention to provide a retaining ring whose compression or expansion with respect to its seating groove may be positively controlled.

Another object of the invention is to provide a ring which may be installed or removed without the use of special tools.

These and other objects and advantages of the invention will become apparent from the following description of preferred and modified forms thereof, and from the drawings illustrating those forms in which:

Figure 1 is a plan view of a retaining ring constructed in accordance with the teachings of this invention;

Figure 2 is a cross-sectional view showing the connection of the threaded member to the ring, taken at 2—2 in Figure 1;

Figure 3 is a view of a ring similar to that shown in Figure 1, but adapted to fit within a housing or a similar enclosure, being a so-called "internal" ring as opposed to the "external" ring of Figures 1 and 2; and Figure 4 is a cross-sectional view of the ring shown in Figure 3 taken at 4—4 thereof.

It will be understood, of course, that the forms of retaining rings which are illustrated herein are in general suitable for use as either inside, or outside rings with suitable and obvious modifications. By reference to the drawings, it will be seen that the form shown in Figures 1 and 2 is an outside ring, while the form shown in Figures 3 and 4 is suitable for use as an inside ring.

Considering first the form shown in Figures 1 and 2, the numeral 20 indicates generally a ring of suitable material, usually metal, formed in the general shape of a split circle but with its ends turned outwardly to provide ears 21 and 22. The size of the circle formed by the ring 20 will be determined by the diameter of the groove into which it is to fit, and the cross-sectional dimensions of the ring will likewise be determined by the dimensions of the groove and the axial load which is to be carried by the ring. In this preferred form, the ears 21 and 22 are bent outwardly so that they lie within the plane of the ring 20.

Attached to each of the ears 21 and 22 is a pin 23 and 24, respectively, whose axes are generally perpendicular to the plane of the ring 20, and which are rotatably held to the ears by rivets 25 or other suitable means. Passing through the pins 23 and 24 a slight distance outwardly from the ears 21 and 22 are holes 27 and 28, respectively, which are formed so that their axes are aligned and parallel to the plane of the ring 20. The holes 27 and 28 are tapped to receive a threaded rod 30, with the threads in hole 27 being formed oppositely to those in hole 28, and the corresponding ends of the rod being provided with cooperating threads. Thus, if hole 27 is tapped to receive a right-hand screwthread, the end of rod 30 fitting within that hole will likewise be provided with right-hand screwthreads. Similarly, under these conditions hole 28 would be provided with left-hand screwthreads as would the end of rod 30 fitting in that hole. A polygonal enlargement 31 is formed in the middle of rod 30, and a wrench may thus be applied to this enlargement to turn the rod. Alternatively, a slot 31a may be formed in the end of rod 30 to receive a screwdriver to effect the rotation of the rod.

The pins 23 and 24 and the threaded rod 30 thus act in the same general manner as a turnbuckle, and the ears 21 and 22 may thus be forced apart or drawn together by turning the polygonal enlargement 31. In this way, the ring 20 may be expanded to fit over a shaft 32 and slid along the latter until a groove, such as groove 33 in Figure 1, is reached, whereupon the ring may be compressed to fit within the groove where it seats firmly and, even though provided with a bevelled edge, cannot be displaced by large axial loads. It will be appreciated that the fact that these retaining rings may be held in an expanded condition without the use of any tools or auxiliary equipment adds greatly to the ease with which they are installed, and also provides a much safer ring, since there is no danger of the rings slipping off the expanding tool and injuring a workman.

In Figures 3 and 4, a ring is shown which is very similar to the form shown in Figures 1 and 2 with the exception that it is designed to be used as an internal ring and expanded to fit within a groove such as may be formed within a housing. As shown in the drawing, a ring 20a, similar to the ring 20, has its ends formed inwardly to provide ears 21a and 22a to which pins 23 and 24 are attached. A screwthreaded rod 30 having a polygonal enlargement 31 is passed through screwthreaded holes similar to holes 27 and 28 in the pins 23 and 24. By applying a wrench to the polygonal enlargement 31, the ears 21a and 22a may be moved toward or away from each other to compress or expand the ring 20a as desired. Thus, the ring 20a may be compressed and aligned with a groove within a housing, and then expanded to seat in that groove. In this way, a member such as a bearing may be held within a housing to support a shaft, and other elements may be similarly mounted within a housing or upon a shaft.

In both of the forms heretofore described, it will be noted that the pins 23 and 24 are rotatably mounted on the ears 21 and 22 or 21a and 22a. The reason for this will be apparent when it is realized that expansion or compression of the ring 20 or 20a will tend to move the ears 21 and 22 or 21a and 22a in a curved path rather than in a straight line. As a result, the axes of holes 27 and 28 would tend to move at an angle to each other were the pins 23 and 24 solidly attached to the ears, resulting in the shaft's tending to bind within the holes. While it is apparent that the pins 23 and 24 extend outwardly from the plane of the ring 20 or 20a, it is very rare that there will be any interference of the pins or of the threaded rod 30 or the polygonal enlargement 31 with adjacent surfaces. The occasional disadvantage resulting from the extension of these members is generally completely overshadowed by the advantages of having a retaining ring which does not require special tools for installation or removal, and which is held within its receiving groove by positive forcing means rather than by resilience of the spring alone.

It will be evident that modifications may be made in the form of the invention as shown herein, but the latter is not to be limited to the particular form or arrangement of parts herein described and shown, except as indicated by the claim.

I claim:

In a retaining ring for a cylindrical member having a concentric second member in contact therewith and an annular groove adjacent said second member, a resilient arcuate main ring portion of substantially flat rectangular cross section peripherally seated in said groove and having an edge protruding radially thereof, said main ring portion terminating in spaced radially extending ears lying in the same plane as the main ring portion, openings in each of said ears spaced substantially away from the protruding edge of said main ring portion, pins rotatably secured in said openings by means not exceeding the thickness of said ears, said pins being provided with coaxial bores, and screw means within the bores of said pins parallel to the plane of the ring and transverse to the axis thereof for varying the distance between said ears to change the effective diameter of said ring.

LUDWIG S. BLUTH.

REFERENCES CITED

The following references are of record in the file of this patent:

UNITED STATES PATENTS

| Number | Name | Date |
|---|---|---|
| 485,484 | Arnold | Nov. 1, 1892 |
| 494,334 | Hills | Mar. 28, 1894 |
| 1,140,535 | Schroeder | May 25, 1915 |
| 1,418,379 | Karle | June 6, 1922 |
| 1,455,935 | Ramsey | May 22, 1923 |
| 1,733,549 | Miller | Oct. 29, 1929 |
| 2,049,847 | Lockhart | Aug. 4, 1936 |
| 2,352,372 | Colarusso | June 27, 1944 |
| 2,416,852 | Schaaff | Mar. 4, 1947 |

FOREIGN PATENTS

| Number | Country | Date |
|---|---|---|
| 349,329 | Great Britain | May 28, 1931 |